US012537711B2

(12) United States Patent
Noguchi

(10) Patent No.: US 12,537,711 B2
(45) Date of Patent: Jan. 27, 2026

(54) ELECTRONIC CONFERENCE SYSTEM, CONTROL METHOD OF ELECTRONIC CONFERENCE SYSTEM, AND STORAGE MEDIUM

(71) Applicant: HONDA MOTOR CO., LTD., Tokyo (JP)

(72) Inventor: Takashi Noguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 153 days.

(21) Appl. No.: 18/398,604

(22) Filed: Dec. 28, 2023

(65) Prior Publication Data

US 2024/0313992 A1 Sep. 19, 2024

(30) Foreign Application Priority Data

Mar. 16, 2023 (JP) .................................. 2023-042313

(51) Int. Cl.
*H04L 12/18* (2006.01)
*G06F 3/14* (2006.01)
*H04L 65/403* (2022.01)
*H04L 65/80* (2022.01)

(52) U.S. Cl.
CPC ........ *H04L 12/1831* (2013.01); *G06F 3/1454* (2013.01); *H04L 65/403* (2013.01); *H04L 65/80* (2013.01)

(58) Field of Classification Search
None
See application file for complete search history.

(56) References Cited

U.S. PATENT DOCUMENTS

| 9,106,710 B1* | 8/2015 | Feimster | H04L 65/403 |
| 10,038,878 B1* | 7/2018 | Seo | H04N 7/15 |
| 2017/0300291 A1* | 10/2017 | Lee | G06F 16/433 |
| 2021/0080270 A1 | 3/2021 | Sugita | |
| 2021/0097208 A1* | 4/2021 | Donahue | G06F 21/84 |
| 2023/0100151 A1* | 3/2023 | Nakashin | G06F 3/1454 715/728 |
| 2024/0056553 A1* | 2/2024 | Brudy | G06Q 10/101 |

FOREIGN PATENT DOCUMENTS

| JP | 2021-047501 A | 3/2021 |
| JP | 2023-012077 A | 1/2023 |

* cited by examiner

*Primary Examiner* — Toan H Vu
(74) *Attorney, Agent, or Firm* — Rankin, Hill & Clark LLP

(57) ABSTRACT

An electronic conference system makes a terminal device display an electronic conference screen including a display object corresponding to each of a plurality of users who participate in an electronic conference, and executes object change processing of analyzing a state of the user using at least one of data of an image photographed in a moving object and data of voice detected in the moving object and changing the display object based on an analysis result, and adjustment processing of executing determination of a load of a processor provided in the terminal device and determination of a state of communication between a server and the terminal device, and selecting data to be used in the object change processing or determining propriety of execution of the object change processing according to the determination results.

11 Claims, 6 Drawing Sheets

FIG.5

126

| No. | COMMUNICATION STATE (UP) | COMMUNICATION STATE (DOWN) | PROCESSOR LOAD | OPERATION MODE | CONDITION OF PROCESSING |
|---|---|---|---|---|---|
| 1 | ○ | ○ | LOW | SERVER | ANALYZE PHOTOGRAPHED IMAGE |
| 2 | ○ | ○ | LOW | TERMINAL | ANALYZE PHOTOGRAPHED IMAGE |
| 3 | ○ | ○ | HIGH | SERVER | ANALYZE PHOTOGRAPHED IMAGE |
| 4 | ○ | ○ | HIGH | TERMINAL | ANALYZE VOICE |
| 5 | × | ○ | LOW | SERVER | ANALYZE VOICE |
| 6 | × | ○ | LOW | TERMINAL | NOT PERFORM USER IMAGE CHANGE PROCESSING |
| 7 | × | ○ | HIGH | SERVER | ANALYZE VOICE |
| 8 | × | ○ | HIGH | TERMINAL | NOT PERFORM USER IMAGE CHANGE PROCESSING |
| 9 | ○ | × | LOW | SERVER | ANALYZE PHOTOGRAPHED IMAGE NOT USE CONFERENCE SCREEN |
| 10 | ○ | × | LOW | TERMINAL | ANALYZE PHOTOGRAPHED IMAGE NOT USE CONFERENCE SCREEN |
| 11 | ○ | × | HIGH | SERVER | ANALYZE PHOTOGRAPHED IMAGE NOT USE CONFERENCE SCREEN |
| 12 | ○ | × | HIGH | TERMINAL | ANALYZE VOICE NOT USE CONFERENCE SCREEN |
| 13 | × | × | LOW | SERVER | NOT CHANGE USER IMAGE (CONFERENCE IMPOSSIBLE) |
| 14 | × | × | LOW | TERMINAL | NOT CHANGE USER IMAGE (CONFERENCE IMPOSSIBLE) |
| 15 | × | × | HIGH | SERVER | NOT CHANGE USER IMAGE (CONFERENCE IMPOSSIBLE) |
| 16 | × | × | HIGH | TERMINAL | NOT CHANGE USER IMAGE (CONFERENCE IMPOSSIBLE) |

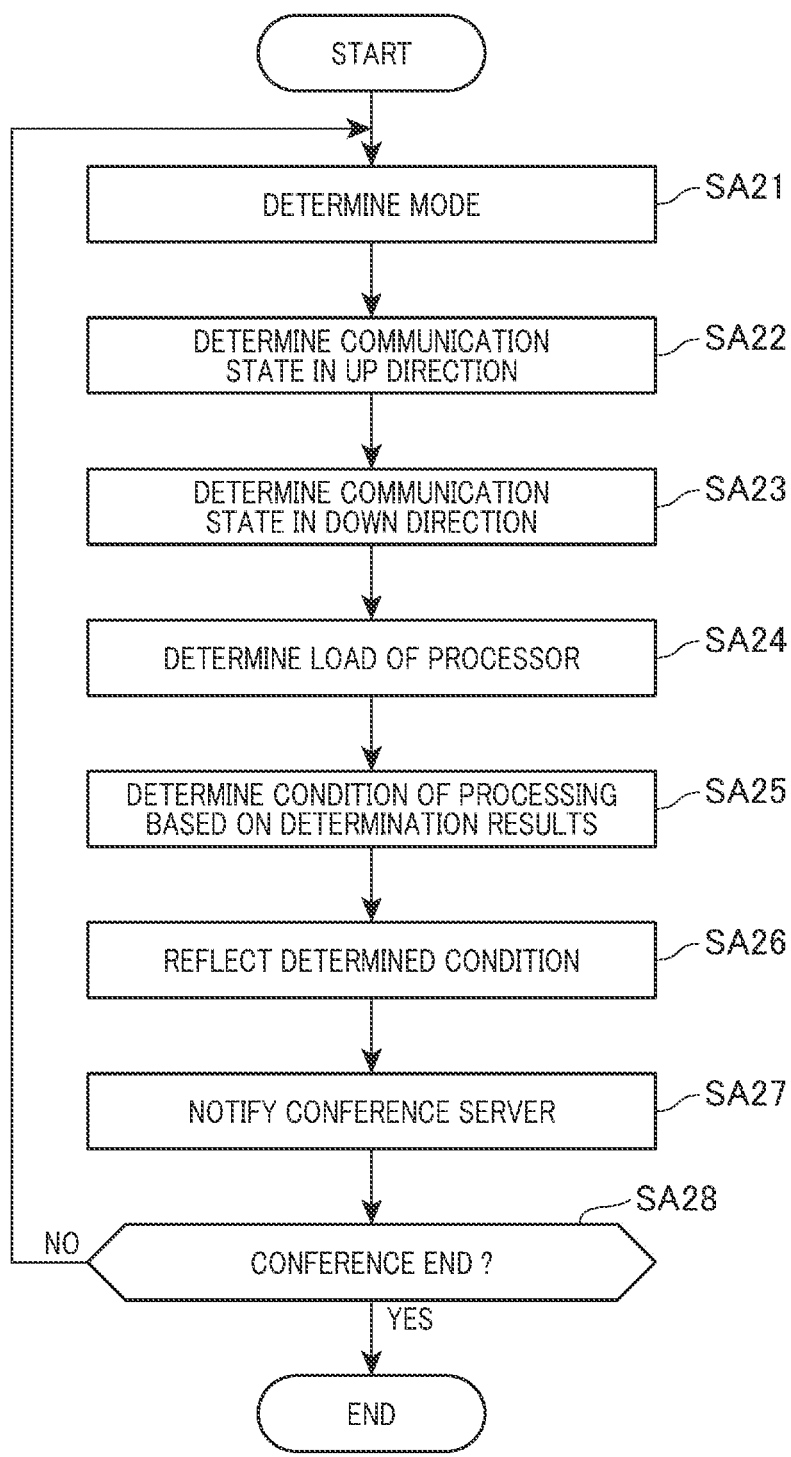

ELECTRONIC CONFERENCE SYSTEM, CONTROL METHOD OF ELECTRONIC CONFERENCE SYSTEM, AND STORAGE MEDIUM

INCORPORATION BY REFERENCE

The present application claims priority under 35 U.S.C. § 119 to Japanese Patent Application No. 2023-042313 filed on Mar. 16, 2023. The content of the application is incorporated herein by reference in its entirety.

BACKGROUND OF THE INVENTION

Field of the Invention

The present invention relates to an electronic conference system, a control method of the electronic conference system, and a storage medium.

Description of the Related Art

In recent years, an approach of providing access to a sustainable transportation system considering even vulnerable people like aged people, handicapped people and children among traffic participants is gaining momentum. Towards the realization, the focus is on research and development for further improving traffic safety and convenience through development regarding comfortability of vehicles.

For example, Japanese Patent Laid-Open No. 2021-047501 discloses a configuration that conference equipment is provided in a moving object and a user inside the moving object can hold a conference utilizing communication. In addition, it is known that an image corresponding to a conference participant is displayed on a display screen of a device in an electronic conference (for example, see Japanese Patent Laid-Open No. 2023-012077).

In a conference called an online conference or an electronic conference, it is needed to transmit and receive a lot of data regarding the conference. Therefore, when a communication state is not good, a phenomenon that a screen regarding the conference is not appropriately displayed or the like occurs.

Specifically, a change of the screen displayed regarding the conference is delayed or the screen is not changed. However, when a user utilizes the electronic conference in a moving object, since the communication state changes accompanying movement of the moving object, it is difficult to maintain the good communication state. In addition, when a load of equipment used by the user in the moving object is high, the phenomenon that the screen regarding the conference is not appropriately displayed or the like occurs.

The present invention is implemented in consideration of the situation described above, and an object is to maintain display of a screen regarding a conference in an appropriate state when a user gets on a moving object and participates in an electronic conference.

SUMMARY OF THE INVENTION

One mode of the present invention aspect is an electronic conference system including a server, and a terminal device configured to communicate with the server, wherein the server makes the terminal device display an electronic conference screen including a display object corresponding to each of a plurality of users who participate in an electronic conference, and the terminal device includes a processor which executes a plurality of application programs including an electronic conference program that makes the user riding in a moving object participate in the electronic conference, the electronic conference system executing object change processing of analyzing a state of the user using at least one of data of an image photographed in the moving object and data of voice detected in the moving object and changing the display object based on an analysis result, and adjustment processing of executing determination of a load of the processor provided in the terminal device and determination of a state of communication between the server and the terminal device, and selecting data to be used in the object change processing or determining propriety of execution of the object change processing according to the determination results.

Advantageous Effect of Invention

According to one mode of the present invention aspect, since processing of changing a display object is adjusted corresponding to a load of a processor of a terminal device and a state of communication, display of a screen regarding a conference can be maintained in an appropriate state in the terminal device used by a user riding in a moving object.

BRIEF DESCRIPTION OF THE DRAWINGS

FIG. 5 is a schematic diagram illustrating a configuration example of processing condition data; and FIG. 6 is a flowchart illustrating an operation example of the terminal device.

DETAILED DESCRIPTION OF THE PREFERRED EMBODIMENTS

[1. Configuration of Electronic Conference System]

Figure 1:
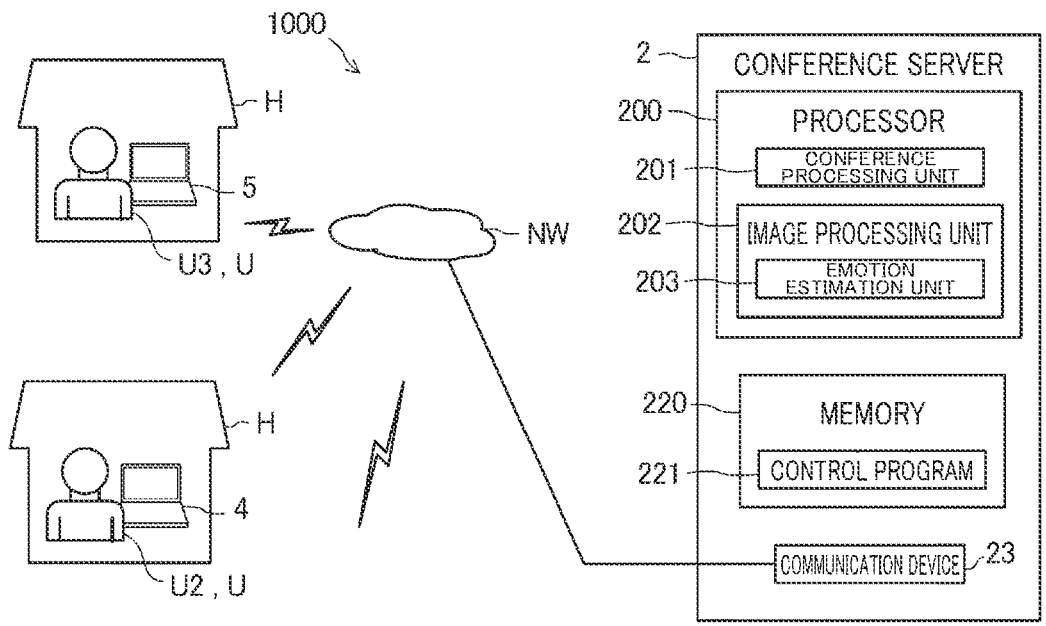
FIG. 1 is a diagram illustrating a configuration example of an electronic conference system.
Figure 1:
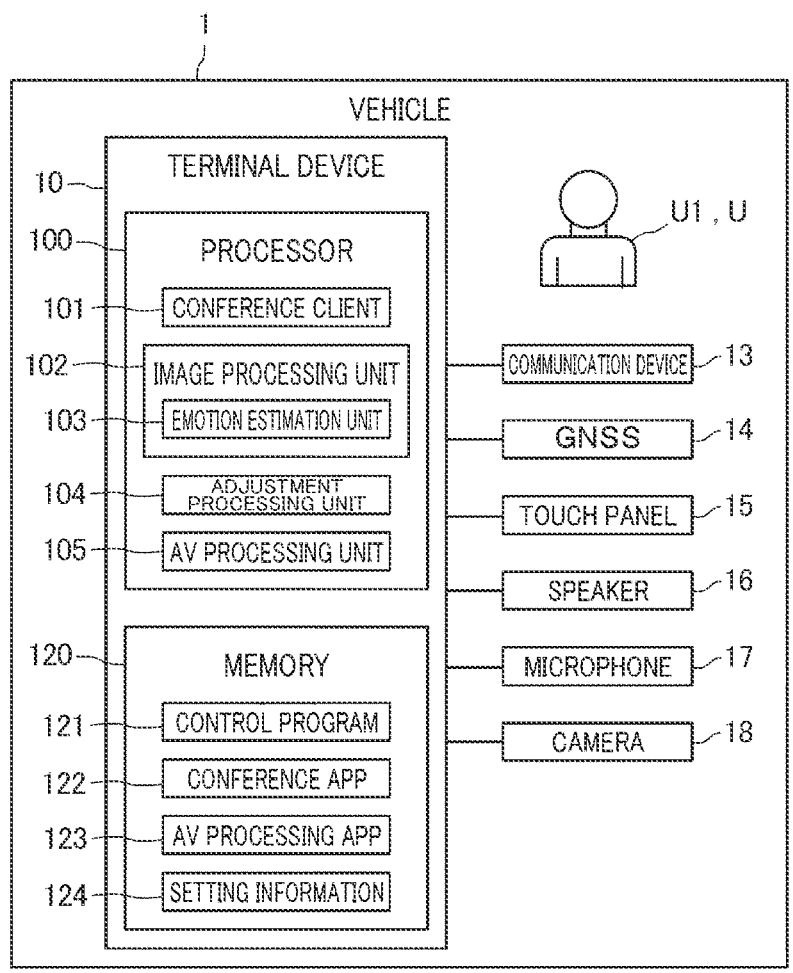

FIG. 1 is a diagram illustrating a configuration example of an electronic conference system 1000.

The electronic conference system 1000 includes a conference server 2 and a plurality of terminal devices, and executes an electronic conference in which a plurality of users U using the terminal devices participate. The electronic conference is also referred to as an online conference, and is the conference executed by conference participants utilizing the terminal devices and sharing voice and information through a communication network NW. The number of the users U who participate in the electronic conference and the number of the terminal devices are not limited. FIG. 1 illustrates, as an example, the electronic conference system 1000 including terminal devices 10, 4 and 5 respectively used by users U1, U2 and U3 who are participants of the electronic conference. Hereinafter, the users U1, U2 and U3 are described as the users U when not to be distinguished.

The conference server 2 is a computer which is connected to the terminal devices 10, 4 and 5 via the communication network NW and transmits and receives data regarding the electronic conference. The conference server 2 may be a single server computer, may be configured by a plurality of server computers, or may be a cloud server.

The conference server 2 accepts participation in the electronic conference by the terminal devices 4, 5 and 10 in response to access from the terminal devices 4, 5 and 10 registered as conference participants. The conference server 2 receives voice data from the terminal devices 4, 5 and 10, and generates voice data of the electronic conference based on the received voice data. The voice data of the electronic conference is data of voice for which the voice of the users U participating in the electronic conference is superimposed or aggregated. In addition, the conference server 2 receives data of video images and images from the terminal devices 4, 5 and 10, and generates data of a conference screen 51 (FIG. 2) using the received video images and images. The conference screen 51 is, for example, a screen where a user image corresponding to each user U participating in the electronic conference is arranged. Details of the conference screen 51 will be described later. The communication network NW is a communication network configured by a public network, an exclusive line and other communication circuits or the like. The conference screen 51 corresponds to an example of an "electronic conference screen". The conference server 2 makes the terminal devices 4, 5 and 10 display the conference screen 51 by transmitting the data of the conference screen 51 to the terminal devices 4, 5 and 10.

The present embodiment explains an example that the user U1 uses the terminal device 10 in a vehicle 1, the user U2 uses the terminal device 4 in a house H, and the user U3 uses the terminal device 5 in the house H. The vehicle 1 is an example of a "moving object". The vehicle 1 only needs to include a cabin (passenger compartment) where the user U1 gets on, and the "moving object" is not limited to a four-wheeled vehicle and may be a vehicle having five or more wheels or a vehicle having three or fewer wheels. In addition, the vehicle as the "moving object" may be a large vehicle such as a bus, a commercial vehicle or a work vehicle or the like. Further, the moving object may be, in addition to a land moving object such as an automobile described above, a marine moving object such as a ship and a submarine, an air moving object such as an aircraft including an eVTOL (Electric Vertical Take-Off and Landing aircraft) and an airship, or a space moving object such as a spacecraft and an artificial satellite. The house H is a general building.

The user U1 is a person who gets on the vehicle 1 and participates in the electronic conference while riding in the vehicle 1. The user U1 may be a driver who steers the vehicle 1 or may be a passenger who rides in the vehicle 1 steered by a person different from the user U1.

[2. Configuration of Terminal Device]

The terminal device 10 is a device loaded in the vehicle 1, and is a computer including a processor 100. The terminal device 10 may be a device fixed to the vehicle 1, or may be a portable device temporarily installed in the vehicle 1. For example, as the terminal device 10, a smartphone, a tablet computer, a personal computer of the other form, a car navigation device, or a display audio device can be employed.

To the terminal device 10, a communication device 13, a GNSS (Global Navigation Satellite System) 14, a touch panel 15, a speaker 16, a microphone 17, and a camera 18 are connected. The devices may be built in the terminal device 10.

The communication device 13 is a wireless communication device including a transmitter which transmits data and a receiver which receives data, and executes cellular communication. The communication device 13 is connected to the communication network NW according to control of the processor 100, and executes data communication with the conference server 2 via the communication network NW.

The GNSS 14 detects a position of the vehicle 1 by receiving a signal from an artificial satellite, generates position information of the vehicle 1, and outputs the position information to the terminal device 10.

The touch panel 15 includes a display screen configured by a liquid crystal display panel or an organic EL (Electro Luminescence) panel, and a touch sensor which is superimposed and disposed on the display screen. The touch panel 15 displays characters and images on the display screen based on a display signal or digital display data output by the terminal device 10. The touch panel 15 detects a touch operation to the display screen by the user U1, specifies an operation position of the detected touch operation, and outputs data indicating the specified operation position to the terminal device 10.

The speaker 16 outputs sound based on a voice signal or digital voice data output by the terminal device 10. The microphone 17 collects the sound and outputs the voice signal or the digital voice data of the collected sound to the terminal device 10. The camera 18 is a digital camera which executes photographing according to the control of the terminal device 10, and outputs photographed image data to the terminal device 10. The plurality of speakers 16, microphones 17 and cameras 18 may be installed in the cabin of the vehicle 1.

The terminal device 10 includes the processor 100 and a memory 120. The processor 100 is a computer configured by a CPU (Central Processing Unit), an MPU (Micro Processing Unit) or the other integrated circuit. The memory 120 is a storage device which stores programs and data. The processor 100 may utilize a volatile RAM (Random Access Memory) as a work area. The RAM may be integrated and mounted on the processor 100 or the memory 120 may include the RAM.

The memory 120 is a rewritable nonvolatile storage device and stores the programs executed by the processor 100 and the data processed by the processor 100. The memory 120 is configured by a semiconductor storage device such as a flash ROM (Read Only Memory) and an SSD (Solid State Disk), or a magnetic storage device. The memory 120 stores a control program 121, a conference app 122, an AV (Audio Visual) processing app 123, setting information 124, and conference information 125.

The control program 121, the conference app 122 and the AV processing app 123 are the programs executed by the processor 100, and are stored in the memory 120 readably by the processor 100. The control program 121 is a basic control program for the processor 100 to control each unit of the terminal device 10, and is an OS (Operating System). The conference app 122 and the AV processing app 123 are application programs executed on the OS.

The processor 100 includes a conference client 101, an image processing unit 102, and an adjustment processing unit 104, as functional units. The functional units are realized by the processor 100 executing the conference app 122. The conference app 122 is an example of a "program" and an "electronic conference program". In addition, the processor 100 includes an AV processing unit 105. The AV processing unit 105 is realized by the processor 100 executing the AV processing app 123. The AV processing unit 105 is an example of a configuration which executes a function different from the electronic conference among the functions executed by the processor 100. The AV processing app 123 is an example of an "application program". That is, the processor 100 executes the plurality of application programs including the conference app 122 which makes the user U1 participate in the electronic conference.

The conference client 101 executes the function as the terminal device used by the participant of the electronic conference, and is connected to the conference server 2 by the communication device 13. The conference client 101 may execute processing of logging in to the conference server 2 by an account of the user U1 who is the participant of the electronic conference.

The conference client 101 transmits the data of the voice collected by the microphone 17 to the conference server 2. The conference client 101 receives the data of the voice of the electronic conference transmitted by the image processing unit 102, and makes the voice of the electronic conference be output from the speaker 16 based on the received data.

The conference client 101 acquires the photographed image data of the camera 18, and transmits the acquired photographed image data or the user image generated using the acquired photographed image data to the image processing unit 102.

The conference client 101 receives the data of the conference screen 51 transmitted by the image processing unit 102, and makes the conference screen 51 be displayed on the touch panel 15 based on the received data.

Figure 2:
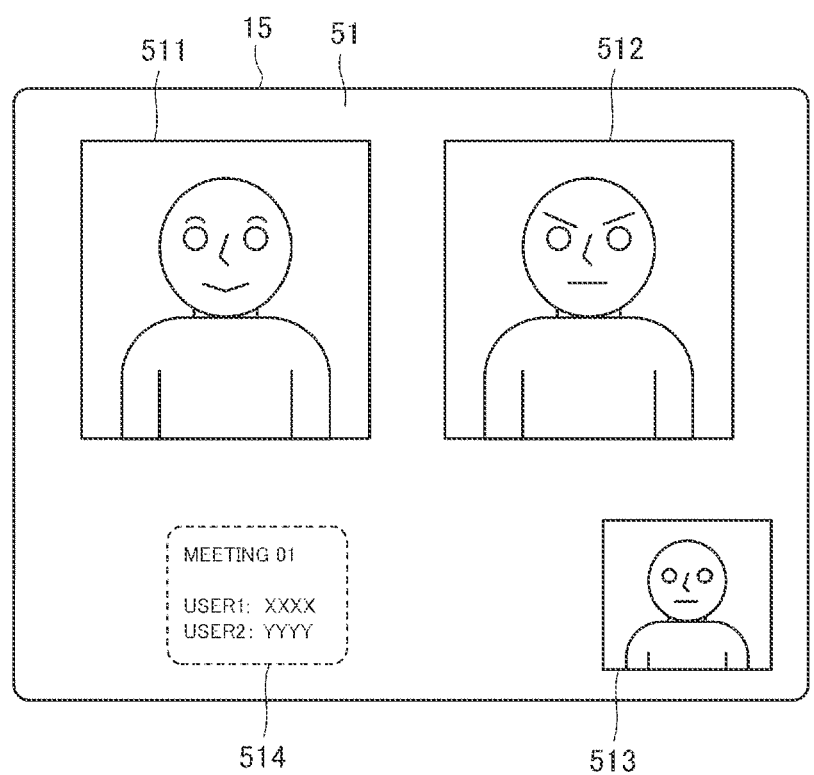
FIG. 2 is a diagram illustrating an example of a screen displayed by a terminal device.

FIG. 2 is a diagram illustrating a configuration example of the conference screen 51. As illustrated in FIG. 2, the conference screen 51 includes a first user image 511, a second user image 512 and a present device image 513 indicating situations of the users U participating in the electronic conference. The present device image 513 is an image indicating the situation of the user U1 himself/herself using the device where the conference screen 51 is displayed. Since the conference screen 51 in FIG. 2 is a screen displayed on the touch panel 15 used by the user U1, the image indicating the situation of the user U1 is displayed as the present device image 513. The first user image 511 and the second user image 512 are the images indicating the situations of the users different from the user U1 among the users participating in the electronic conference. In the present embodiment, the first user image 511 is the image indicating the situation of the user U2, and the second user image 512 is the image indicating the situation of the user U3. Further, the conference screen 51 may include a participant display unit 514 which lists and displays names and account names of the users U participating in the electronic conference.

The first user image 511 may be a photographed image of the user U2 photographed by the terminal device 4. Similarly, the second user image 512 may be a photographed image of the user U3 photographed by the terminal device 5, and the present device image 513 may be a photographed image of the user U1 photographed by the camera 18.

In the electronic conference system 1000, as the first user image 511, the second user image 512 and the present device image 513, not the photographed images but the user images are used. The user image is an image which is so called an avatar different from an actual photographed image. Specifically, the user image is a prepared still image such as an illustration and an icon or the like. The user image may be an image on which the name of the user U who is the conference participant is superimposed. The electronic conference system 1000 utilizes an image of a face of a human or a character representing the human, as the user image.

The conference screen 51 illustrated in FIG. 2 is the screen displayed on the touch panel 15 by the terminal device 10. The conference server 2 generates the data of the conference screen 51 corresponding to each of the terminal devices 4, 5 and 10. For example, the user image of the user U2 is disposed as the present device image 513 in the conference screen 51 displayed by the terminal device 4, and the user image of the user U3 is disposed as the present device image 513 in the conference screen 51 displayed by the terminal device 5.

The electronic conference system 1000 has a function of changing the user image which is the image of the face of the character according to the state of the user U. The state of the user U may be an action of the user U. For example, the electronic conference system 1000 may change the present device image 513 which is the user image between time when the user U1 is speaking and the time when the user U1 is not speaking. In the present embodiment, as the state of the user U, an estimation result of an emotion of the user U is utilized. That is, the electronic conference system 1000 estimates the emotion of the user U and changes the user image so as to be an image expressing the estimated emotion of the user U. For example, the electronic conference system 1000 estimates which of joy, anger, sorrow, comfort and calmness the emotion of the user U is, and defines one of five images corresponding to each of the joy, the anger, the sorrow, the comfort and the calmness as the user image according to the estimation result. The electronic conference system 1000 can more finely estimate the emotion of the user U and may change the user image into more states.

Processing that the electronic conference system 1000 changes the user image according to the state of the user U is called user image change processing. The user image change processing is an example of "object change processing". That is, the user image used as the first user image 511, the second user image 512 and the present device image 513 is an example of a "display object".

The electronic conference system 1000 is capable of executing both of an operation state that the conference server 2 executes the user image change processing and an operation state that the terminal devices 4, 5 and 10 execute the user image change processing. Hereinafter, the operation state that the conference server 2 executes the user image change processing is called a server mode, and the operation state that the terminal devices 4, 5 and 10 execute the user image change processing is called a terminal mode. The electronic conference system 1000 switches and executes the server mode and the terminal mode. The switching may be performed for each of the terminal devices 4, 5 and 10. For example, the electronic conference system 1000 may execute the user image change processing regarding the user image of the user U1, the user image change processing regarding the user image of the user U2 and the user image change processing regarding the user image of the user U3 individually in the server mode or in the terminal mode.

When the terminal device 10 executes the terminal mode, the image processing unit 102 executes the user image change processing. In the user image change processing, the image processing unit 102 performs the processing of generating the user image and changing the user image. The image processing unit 102 includes an emotion estimation unit 103. The emotion estimation unit 103 estimates the emotion of the user U1 by analyzing the voice of the user U1 collected by the microphone 17 and the photographed image of the user U1 photographed by the camera 18. As the processing of estimating the emotion of the user U1, various known techniques can be utilized.

The emotion estimation unit 103 estimates the emotion of the user U1 by utilizing at least one of the data of the voice collected by the microphone 17 and the photographed image data of the camera 18. When utilizing the data of the voice, for example, the emotion estimation unit 103 analyzes the data of the voice collected by the microphone 17, obtains scores for items such as intonation of the voice, change of magnitude of the voice, voice quality, a speed of words spoken by the user U1 and a tone, and estimates the emotion of the user U1 from the obtained scores. When utilizing the photographed image data, for example, the emotion estimation unit 103 estimates the emotion of the user U1 by analyzing an expression of the user U1 from the photographed image data and specifying shapes and movements of eyes, a mouth and a nose of the user U1.

The image processing unit 102 generates the user image or changes the user image so as to correspond to the emotion of the user U1 estimated by the emotion estimation unit 103. The image processing unit 102 transmits the user image after the user image change processing to the conference server 2. The conference server 2 generates the data of the conference screen 51 by utilizing the user image received from the terminal device 10, and transmits it to the terminal devices 4, 5 and 10.

In this way, in the user image change processing, the image processing unit 102 analyzes the state of the user U1 using at least one of the photographed image data photographed in the vehicle 1 and the data of the voice detected in the vehicle 1. Then, the image processing unit 102 estimates the emotion of the user U1, and changes the user image according to the estimated emotion of the user U1.

When the user image change processing regarding the user U1 is executed in the server mode, the image processing unit 102 and the emotion estimation unit 103 are not operated.

The adjustment processing unit 104 executes adjustment processing regarding the user image change processing. The adjustment processing is the processing of adjusting contents of the user image change processing, and includes at least one of selection of the data to be used in the user image change processing and determination of propriety of execution of the user image change processing, for example.

The adjustment processing unit 104 determines a load of the processor 100, determines a state of communication between the terminal device 10 and the conference server 2, and adjusts the user image change processing according to the determination results. For example, the adjustment processing unit 104 calculates a usage rate of the processor 100, and when the usage rate is equal to or higher than a preset threshold, determines that the load of the processor 100 is a high load. In this case, when the usage rate of the processor 100 is lower than the threshold, it is determined that the load of the processor 100 is a low load. In addition, as the state of the communication between the terminal device 10 and the conference server 2, the adjustment processing unit 104 measures a communication speed, delay or a ping value and a jitter value, for example. The measurement is performed, for example, in each of an up direction which is a direction of transmitting the data from the terminal device 10 to the conference server 2 and a down direction which is a direction of transmitting the data from the conference server 2 to the terminal device 10. The up direction is an example of a "first direction", and the down direction is an example of a "second direction". The adjustment processing unit 104 determines that the communication state is good when the measured communication speed is equal to or higher than a preset threshold and the delay is smaller than a preset threshold, and determines that the communication state is not good in the other cases. The adjustment processing unit 104 may not directly determine the state of the communication in a communication route connecting the terminal device 10 and the conference server 2. For example, the adjustment processing unit 104 may determine the communication state with a part of the communication route used by the terminal device 10 for data communication with the conference server 2 as a target. Various kinds of thresholds used by the adjustment processing unit 104 are, for example, included in the setting information 124 and stored in the memory 120.

The adjustment processing unit 104 selects the data to be used in the user image change processing based on whether the load of the processor 100 is the high load or the low load and whether or not the communication state is good. Specifically, the adjustment processing unit 104 determines whether to use video data or to use only the voice data without using the video data in the user image change processing. Using the video data in the user image change processing includes using only the video data and using the voice data together. The adjustment processing unit 104 selects the data to be used in the user image change processing depending on whether the user image change processing is executed in the server mode or is executed in the terminal mode. Further, the adjustment processing unit 104 may determine not to perform the user image change processing based on the determination results of the load of the processor 100 and the communication state. In this case, the user image change processing is not executed and the user image in the conference screen 51 is not changed.

The AV processing unit 105 manages and reproduces video contents and music contents according to an operation of the user U1. The AV processing unit 105 reproduces the video contents specified by the user U1, displays video images on the touch panel 15, and outputs sound included in the video contents from the speaker 16. In addition, the AV processing unit 105 reproduces the music contents specified by the user U1 and outputs the sound from the speaker 16. The data of the video contents and the music contents reproduced by the AV processing unit 105 is stored in the memory 120, for example. Further, the AV processing unit 105 downloads the data of the video contents and the music contents by utilizing the communication device 13 according to the operation of the user U1. In addition, the AV processing unit 105 executes deletion or the like of the video contents and the music contents stored in the memory 120 according to the operation of the user U1.

The AV processing unit 105 executes the operation independently of the conference client 101, the image processing unit 102 and the adjustment processing unit 104. For example, the AV processing unit 105 can execute reproduction of the music contents and downloading of the video contents or the like while the conference client 101 participates in the electronic conference.

The AV processing unit 105 is an example of the function that the processor 100 executes the application program different from the program regarding the electronic conference. The processor 100 may have other functions, for example, instead of the AV processing unit 105 or in addition to the AV processing unit 105. For example, the processor 100 may execute the function as a car navigation device by executing the application program for navigation.

The terminal device 4 and the terminal device 5 can be configured similarly to the terminal device 10. In this case, the terminal devices 4 and 5 can include the processor 100 and the memory 120 provided in the terminal device 10. In addition, the terminal devices 4 and 5 can be the configuration not including the AV processing unit 105 and the AV processing app 123. Further, the terminal devices 4 and 5 preferably have the configuration corresponding to respective units of the touch panel 15, the speaker 16, the microphone 17 and the camera 18, and the configuration corresponding to the GNSS 14 is not essential.

[3. Configuration of Conference Server]

The conference server 2 includes a processor 200 and a memory 220. The processor 200 is configured by a CPU, an MPU or the other integrated circuit. The memory 220 is a storage device which stores programs and data. The processor 200 may utilize a volatile RAM as a work area. The RAM may be integrated and mounted on the processor 200 or the memory 220 may include the RAM.

The memory 220 is a rewritable nonvolatile storage device and stores the programs executed by the processor 200 and the data processed by the processor 200. The memory 220 is configured by a semiconductor storage device such as a flash ROM and an SSD, or a magnetic storage device. The memory 220 stores a control program 221 and conference data 222.

The control program 221 is a program executed by the processor 200, and is stored in the memory 220 readably by the processor 200. The control program 221 is a basic control program for the processor 200 to control each unit of the conference server 2, and is so called an OS.

The processor 200 includes a conference processing unit 201 and an image processing unit 202, as functional units. The functional units are realized by the processor 200 executing the program.

The conference processing unit 201 executes the electronic conference in which the plurality of users U participate. The conference processing unit 201 receives the data of the voice transmitted by the terminal devices 4, 5 and 10, generates the data of the voice of the conference based on the received data, and transmits it to the terminal devices 4, 5 and 10.

The conference processing unit 201 generates the data of the conference screen 51 including the user image corresponding to each user U based on the data transmitted by the terminal devices 4, 5 and 10, and transmits it to the terminal devices 4, 5 and 10.

The image processing unit 202 executes the user image change processing in the server mode. The image processing unit 202 includes an emotion estimation unit 203. The emotion estimation unit 203 estimates the emotion of the user U by analyzing the data of the voice transmitted by the terminal devices 4, 5 and 10 and the photographed image data transmitted by the terminal devices 4, 5 and 10. As the processing of estimating the emotion of the user U, various known techniques can be utilized. For example, the emotion estimation unit 203 performs the processing similar to that of the emotion estimation unit 103.

The image processing unit 202 generates the user image or changes the user image so as to correspond to the emotion of the user U estimated by the emotion estimation unit 203. The image processing unit 202 generates the conference screen 51 including the user image after the user image change processing, and transmits it to the terminal devices 4, 5 and 10.

For example, when executing the user image change processing regarding the user U1 in the server mode, the image processing unit 202 analyzes the state of the user U1 using at least one of the photographed image data photographed in the vehicle 1 and the data of the voice detected in the vehicle 1. Then, the image processing unit 202 estimates the emotion of the user U1, and changes the user image according to the estimated emotion of the user U1.

When the user image change processing regarding the user U1 is executed in the terminal mode, the image processing unit 202 and the emotion estimation unit 203 do not perform the processing regarding the user U1.

In addition, when executing the user image change processing in the server mode, in a case where a notice indicating a condition of the user image change processing is received from the terminal device 10, the image processing unit 202 executes the user image change processing according to the notified condition.

[4. Operation of Electronic Conference System]

Figure 3:
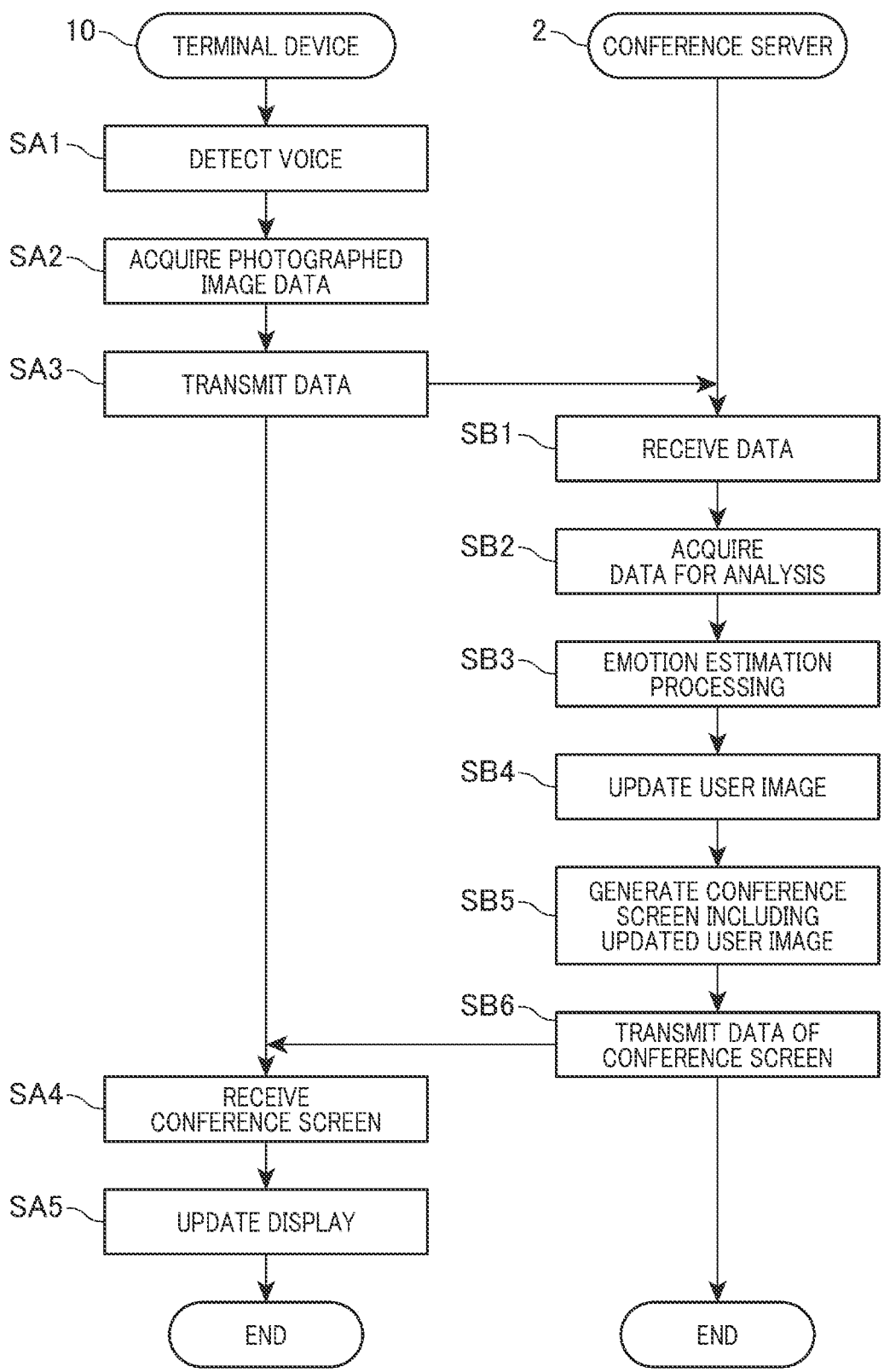
FIG. 3 is a sequence diagram illustrating an operation example of the electronic conference system.
Figure 4:
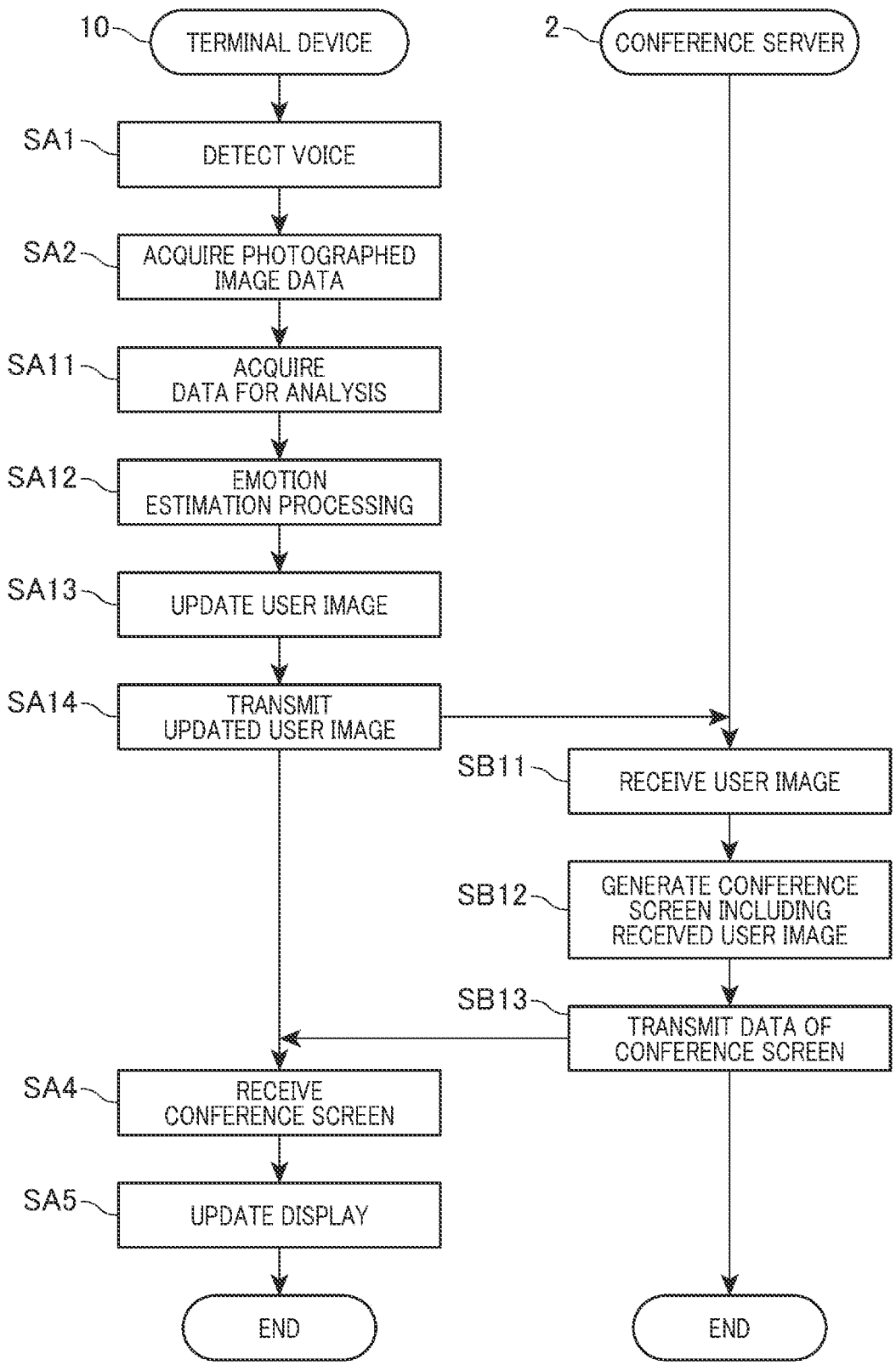
FIG. 4 is a sequence diagram illustrating an operation example of the electronic conference system.

FIG. 3 and FIG. 4 are sequence diagrams illustrating operation examples of the electronic conference system 1000. FIG. 3 illustrates the user image change processing in the server mode, and FIG. 4 illustrates the user image change processing in the terminal mode. Steps SA1-SA5 are executed by the conference client 101 of the terminal device 10, and steps SA11-SA14 are executed by the image processing unit 102. Steps SB1, SB5-SB6 and SB11-SB13 are executed by the conference processing unit 201 of the conference server 2, and SB2-SB4 are executed by the image processing unit 202.

In FIG. 3, the terminal device 10 detects the voice by the microphone 17 (step SA1), and acquires the photographed image data of the camera 18 (step SA2). The terminal device 10 transmits the data of the voice detected by the microphone 17 and the photographed image data to the conference server 2 by the communication device 13 (step SA3). The data transmitted to the conference server 2 by the terminal device 10 in step SA3 is an example of "detection data".

The conference server 2 receives the data transmitted by the terminal device 10 (step SB1), and acquires the data for analysis to be used by the emotion estimation unit 203 from the received data (step SB2). The conference server 2 executes emotion estimation processing by the emotion estimation unit 203 (step SB4), and updates the user image of the user U1 according to the estimated emotion of the user U1 (step SB4). When executing step SB4 for the first time, the conference server 2 generates the user image. The conference server 2 generates the data of the conference screen 51 including the updated user image of the user U1 (step SB5). The conference server 2 transmits the data for displaying the conference screen 51 to the terminal device 10 (step SB6).

The terminal device 10 receives the data for displaying the conference screen 51 from the conference server 2 (step SA4), and updates display of the conference screen 51 on the touch panel 15 (step SA5).

In the operation of FIG. 4, same step numbers are attached to the processing in common with FIG. 3 and explanation is omitted. In FIG. 4, the terminal device 10 executes steps SA1-SA2, and acquires the data for the analysis to be used by the emotion estimation unit 103 (step SA11). In step SA11, the terminal device 10 acquires at least one of the voice data and the photographed image data, for example.

The terminal device 10 executes the emotion estimation processing by the emotion estimation unit 103 (step SA12), and updates the user image of the user U1 according to the estimated emotion of the user U1 (step SA13). When executing step SA13 for the first time, the terminal device 10 generates the user image of the user U1. The terminal device 10 transmits the updated user image of the user U1 to the conference server 2 (step SA14).

The conference server 2 receives the user image of the user U1 updated by the terminal device 10 (step SB11), and generates the data of the conference screen 51 including the received user image (step SB12). The conference server 2 transmits the data for displaying the conference screen 51 to the terminal device 10 (step SB13).

The terminal device 10 receives the data for displaying the conference screen 51 from the conference server 2 (step SA4), and updates the display of the conference screen 51 on the touch panel 15 (step SA5).

In this way, when executing the user image change processing in the terminal mode, the terminal device 10 transmits the user image changed in the user image change processing to the conference server 2, and the conference server 2 makes the terminal device 10 display the conference screen 51 including the user image transmitted from the terminal device 10. In addition, when executing the user image change processing in the server mode, the terminal device 10 transmits the detection data including at least one of the data of the images photographed in the vehicle 1 and the data of the voice detected in the vehicle 1 to the conference server 2, and the conference server 2 executes the user image change processing using the detection data transmitted from the terminal device 10 and makes the terminal device 10 display the conference screen 51 including the user image changed in the user image change processing.

Next, the adjustment processing executed by the adjustment processing unit 104 will be explained.

FIG. 5 is a diagram illustrating a configuration example of processing condition data 126. The processing condition data 126 is the data that the adjustment processing unit 104 refers to in the adjustment processing, and is the data which determines the condition of the user image change processing corresponding to the communication state, the load of the processor 100 and whether the user image change processing is the server mode or the terminal mode. The processing condition data 126 is, for example, included in the setting information 124 and stored in the memory 120.

As illustrated in FIG. 3 and FIG. 4, in the user image change processing, transmission and reception of the photographed image data of the camera 18 and the voice data of the microphone 17 or transmission and reception of the user image of the user U1 changed by the terminal device 10 occur. In addition, the processing that the communication device 13 receives the data of the conference screen 51 generated by the conference server 2 also occurs. Since the vehicle 1 is a traveling moving object, the state of the communication between the communication device 13 and the conference server 2 is not good at all times. When the state of the communication between the terminal device 10 and the conference server 2 is not good, communication delay causes delay in timing of the change of the user image on the conference screen 51 and disturbance of the conference screen 51 or the like, and it becomes difficult to appropriately maintain the conference screen 51. Further, the processor 100 executes the application programs other than the conference app 122 as described above. Therefore, there is a possibility that the load of the processor 100 becomes the high load and output of the voice of the electronic conference and the display of the conference screen 51 are disturbed while the user U1 participates in the electronic conference. In addition, when the load of the processor 100 is increased by the user image change processing, there is a possibility that the processor 100 is overloaded and the execution of the application programs other than the conference app 122 is affected.

Therefore, the adjustment processing unit 104 executes the adjustment processing as indicated in the processing condition data 126, and determines the condition of the user image change processing. Thus, the electronic conference system 1000 prevents the disturbance of the display of the conference screen 51 due to the communication delay and the overload of the processor 100.

The processing condition data 126 distinguishes each of the state of the communication in the up direction and the state of the communication in the down direction, and determines the condition of the user image change processing. In FIG. 5, circle marks indicate that the communication state is good and X marks indicate that the communication state is not good. In addition, in FIG. 5, "LOW" indicates that the load of the processor 100 is the low load, and "HIGH" indicates that the load of the processor 100 is the high load. In FIG. 5, an operation mode indicates a mode of the user image change processing, "server" indicates the case where the server mode is being executed, and "terminal" indicates the case where the terminal mode is being executed.

The adjustment processing unit 104 determines the condition of the user image change processing according to the processing condition data 126. For example, the condition of the terminal mode when an up communication state and a down communication state are good is, as illustrated in No. 2 and No. 4, determined to analyze the photographed image by the image processing unit 102 in the user image change processing in the case where the load of the processor 100 is the low load, and determined to analyze the voice in the case where the load of the processor 100 is the high load. In other words, No. 4 in FIG. 5 indicates that, in the case of executing the terminal mode and in the case where it is determined that the load of the processor 100 is the high load, the voice data is to be used in the user image change processing even when the communication state is good. Using the voice data in the user image change processing means that the photographed image data is not used.

That is, when the load of the processor 100 is the low load, the image processing unit 102 determines the state of the user U1 and changes the user image by utilizing the photographed image data of the camera 18. When the load of the processor 100 is the high load, the image processing unit 102 determines the state of the user U1 and changes the user image by utilizing the data of the voice collected by the microphone 17. Since a data amount to be processed is small in the case where the image processing unit 102 processes the voice data compared to the case of processing the photographed image data, a computation amount for determining the state of the user U1 is small. Therefore, even when the processor 100 is in a high load state, the delay of the user image change processing or the like is not caused, the disturbance and delay of the conference screen 51 are prevented, and the conference screen 51 can be displayed in an appropriate state.

Further, for example, when the up communication state and the down communication state are good, as illustrated in No. 1 and No. 3 in FIG. 5, the condition of the server mode is determined to analyze the photographed image by the image processing unit 202, whether the load of the processor 100 is the low load or the high load. In this case, the image processing unit 202 determines the state of the user U1 and changes the user image by utilizing the photographed image data transmitted by the terminal device 10. In the server mode, since the conference server 2 executes the user image change processing, the photographed image data can be processed without problems even when the load of the processor 100 is the high load.

Further, for example, as illustrated in No. 6 and No. 8, in the case of executing the terminal mode and in the case where the state of the communication in the up direction is not good, the user image change processing is not performed regardless of the load of the processor 100. The terminal device 10 does not perform the processing of changing the user image of the user U1 by the image processing unit 102 and does not transmit the user image to the conference server 2. In addition, as the present device image 513 on the conference screen 51, instead of the user image, the still image of the icon or the like stored in the memory 120 beforehand is displayed. Thus, volume of the data transmitted from the terminal device 10 to the conference server 2 is reduced. Therefore, it is possible to prevent the delay of the processing that the conference server 2 generates the data of the conference screen 51 using the user image. In addition, when the terminal device 10 performs the communication by the communication device 13 based on a function different from the electronic conference, there is an advantage that a band of the communication is not obstructed.

Further, for example, as illustrated in No. 5 and No. 7, in the case of executing the server mode and in the case where it is determined that the state of the communication in the up direction from the conference server 2 to the terminal device 10 is not good, it is determined to analyze the voice data in the user image change processing. In this case, the adjustment processing unit 104 may further determine not to transmit the photographed image data from the conference server 2 to the terminal device 10. In this case, the image processing unit 202 can execute the user image change processing without transmitting large volume of the image data from the conference server 2 to the terminal device 10.

In No. 9-No. 12, the adjustment processing unit 104 determines to display the conference screen 51 without using the data of the conference screen 51 transmitted by the conference server 2. In No. 9-No. 12, the state of the communication in the up direction is good and the state of the communication in the down direction is not good. In this case, the terminal device 10 does not utilize the data of the conference screen 51 transmitted by the conference server 2. Specifically, the conference client 101 makes the user U1 participate in the electronic conference only by the voice without displaying the conference screen 51. In addition, the conference client 101 may display the conference screen 51 which does not include the user image. Specifically, the conference client 101 generates and displays the conference screen 51 in which the still image of the icon or the like stored in the memory 120 beforehand is arranged as the first user image 511, the second user image 512 and the present device image 513. Thus, the terminal device 10 can display the conference screen 51 without having the data of the conference screen 51 transmitted by the conference server 2. Therefore, even when the state of the communication from the conference server 2 to the terminal device 10 is not good, it is possible to prevent the disturbance of the display of the conference screen 51 or the like.

Further, in No. 9-No. 12, the adjustment processing unit 104 may determine to execute the user image change processing in the conference server 2 and the terminal device 10. For example, as the condition of the user image change processing, the photographed image data is used in the server mode, and utilization of the photographed image data and utilization of the voice data are switched according to the load of the processor 100 in the terminal mode. That is, the electronic conference system 1000 performs the user image change processing of changing the user image of the user U1 but the user image of the user U1 is not used in the terminal device 10. Thus, since the state of the communication in the up direction is good, the conference screen 51 can be displayed as usual at the terminal devices 4 and 5 excluding the terminal device 10.

Further, for example, in No. 13-No. 16, the adjustment processing unit 104 determines not to execute the user image change processing. In these cases, since neither of the states of the communication in the up direction and the communication in the down direction is good, it is difficult to stably execute the electronic conference using the terminal device 10. Therefore, the adjustment processing unit 104 can improve efficiency of the utilization of resources of the processors 100 and 200 by not performing the user image change processing.

FIG. 6 is a flowchart illustrating an operation example of the terminal device 10, and illustrates the adjustment processing. Steps SA21-SA28 are executed by the adjustment processing unit 104.

The terminal device 10 determines whether the mode of the user image change processing is the server mode or the terminal mode (step SA21). The terminal device 10 determines the state of the communication in the up direction between the terminal device 10 and the conference server 2 (step SA22), and determines the state of the communication in the down direction (step SA23). The terminal device 10 determines the load of the processor 100 (step SA24).

The terminal device 10 determines the condition of the user image change processing by referring to the processing condition data 126 based on the determination results of steps SA21-SA24 (step SA25). In step SA25, the terminal device 10 makes determination including not performing the user image change processing.

The terminal device 10 reflects the condition determined in step SA25 on the user image change processing (step SA26). That is, contents of steps SA3-SA4 and SA11-SA14 executed by the terminal device 10 in the user image change processing are changed according to the condition determined in step SA25. Further, the terminal device 10 notifies the conference server 2 of the condition determined in step SA25 to be reflected on the user image change processing (step SA27). That is, it is notified to change the contents of steps SB2-SB5 and SB11-SB13 executed by the conference server 2 in the user image change processing according to the condition determined in step SA25.

The adjustment processing unit 104 determines whether or not the electronic conference is to end (step SA28), and returns to step SA21 when the electronic conference is not to end (step SA28; NO). In addition, when the electronic conference is to end (step SA28; YES), the present processing is ended.

5. Other Embodiments

The embodiment described above only illustrates one mode and can be arbitrarily modified and applied.

In the embodiment described above, the operation that the adjustment processing unit 104 refers to the processing condition data 126 in the adjustment processing is explained, however, it is an example. For example, algorithm configured to make the determination similar to the processing condition data 126 may be executed in the adjustment processing, and the processing condition data 126 may not be utilized.

In the embodiment described above, the case where the adjustment processing unit 104 of the terminal device 10 executes the adjustment processing is explained, however, it is an example. For example, the terminal device 10 and the conference server 2 may cooperate and execute the adjustment processing. For example, the terminal device 10 may execute the determination of the communication state and the determination of the load of the processor 100, and the conference server 2 may execute the processing of determining the condition of the user image change processing based on the determination results.

In addition, the terminal device 10 may not be a device fixed to the vehicle 1 and may be a portable device temporarily installed in the vehicle 1. For example, the terminal device 10 may be a smartphone, a tablet computer, a personal computer of the other form, a car navigation device, or a display audio device.

The processor 100 and the processor 200 may be configured by a single processor, or may be configured by a plurality of processors. The processor 100 and the processor 200 may be hardware programmed to realize the corresponding functional units. That is, the processor 100 and the processor 200 may be configured by, for example, an ASIC (Application Specific Integrated Circuit) or an FPGA (Field Programmable Gate Array).

Further, the configuration of each unit of the electronic conference system 1000 illustrated in FIG. 2 is an example, and a specific mounting form is not limited in particular. That is, hardware individually corresponding to each unit does not necessarily need to be mounted, and it is of course possible that one processor realizes the function of each unit by executing a program. In addition, some of the functions realized by software in the embodiment described above may be hardware, or some of the functions realized by hardware may be realized by software.

Further, step units of the operation illustrated in FIG. 3, FIG. 4 and FIG. 6 are divided according to main processing contents in order to facilitate understanding of the operation, and the present invention is not limited by a method or a name of division of processing units. The division may be performed into further more step units according to the processing contents. In addition, the division may be performed such that one step unit includes further more processing. Further, an order of the steps may be appropriately changed without obstructing the gist of the present invention.

In addition, when realizing a control method of the electronic conference system 1000 described above by using the processor 100, it is also possible to configure the program to be executed by the processor 100 in a mode of a non-transitory recording medium or a transmission medium which transmits the program. That is, it is also possible to realize the conference app 122 in a state of recording the conference app 122 in a portable information recording medium. Examples of the information recording medium are a magnetic recording medium such as a hard disk, an optical recording medium such as a CD, and a semiconductor storage device such as a USB (Universal Serial Bus) memory and an SSD (Solid State Drive), and the other recording medium can be also used.

6. Configurations Supported by Embodiments Described Above

The embodiments described above support the following configurations.

(Configuration 1) An electronic conference system including a server, and a terminal device configured to communicate with the server, wherein the server makes the terminal device display an electronic conference screen including a display object corresponding to each of a plurality of users who participate in an electronic conference, and the terminal device includes a processor which executes a plurality of application programs including an electronic conference program that makes the user riding in a moving object participate in the electronic conference, the electronic conference system executing object change processing of analyzing a state of the user using at least one of data of an image photographed in the moving object and data of voice detected in the moving object and changing the display object based on an analysis result, and adjustment processing of executing determination of a load of the processor provided in the terminal device and determination of a state of communication between the server and the terminal device, and selecting data to be used in the object change processing or determining propriety of execution of the object change processing according to the determination results.

According to the electronic conference system of configuration 1, the processing of changing the display object can be adjusted corresponding to the load of the processor of the terminal device and the state of the communication. Therefore, it is possible to prevent disturbance or the like of the display due to the communication state when the user participates in the electronic conference from the moving body where the communication state tends to be unstable. In addition, various effects such as preventing the processor of the terminal device from being overloaded and enabling the user to comfortably utilize the function of the terminal device can be obtained. Thus, in the terminal device used by the user riding in the moving object, the display of the screen regarding the conference can be maintained in the appropriate state.

(Configuration 2) The electronic conference system according to configuration 1, being capable of executing a terminal mode of executing the object change processing by the terminal device and a server mode of executing the object change processing by the server, wherein, when executing the terminal mode, the terminal device transmits the display object changed in the object change processing to the server and the server makes the terminal device display the electronic conference screen including the display object transmitted from the terminal device, and when executing the server mode, the terminal device transmits detection data including at least one of the data of the image photographed in the moving object and the data of the voice detected in the moving body to the server and the server executes the object change processing using the detection data transmitted from the terminal device and makes the terminal device display the electronic conference screen including the display object changed in the object change processing.

According to the electronic conference system of configuration 2, the processing of changing the display object can be adjusted corresponding to each of the case where the terminal device executes the object change processing and the case where the server executes the object change processing. Thus, in the terminal used by the user riding in the moving object, the display of the screen regarding the conference can be maintained in the appropriate state.

(Configuration 3) The electronic conference system according to configuration 2, wherein the data to be used in the object change processing is selected or the propriety of the execution of the object change processing is determined depending on which of the terminal mode and the server mode is being executed, by the adjustment processing.

According to the electronic conference system of configuration 3, adjustment including not performing the object change processing can be executed corresponding to each of the case where the terminal device executes the object change processing and the case where the server executes the object change processing. Thus, it is possible to enable the user riding in the moving object to comfortably utilize the electronic conference.

(Configuration 4) The electronic conference system according to configuration 3, wherein it is determined to analyze the state of the user using the data of the image by the object change processing regardless of the determination result of the load of the processor, when executing the server mode and when it is determined that the state of the communication between the server and the terminal device is good, by the adjustment processing.

According to the electronic conference system of configuration 4, the object change processing which reflects the state of the user in more details can be executed by utilizing the image data when the state of the communication between the server and the terminal device is good.

(Configuration 5) The electronic conference system according to configuration 3, wherein it is determined to analyze the state of the user using the data of the voice by the object change processing even when the determination result of the state of the communication between the server and the terminal device is good, when executing the terminal mode and when it is determined that the load of the processor is a high load, by the adjustment processing.

According to the electronic conference system of configuration 5, by utilizing the voice data in the object change processing, it is possible to prevent the overload of the processor of the terminal device and enable the user riding in the moving object to comfortably utilize the function of the terminal device.

(Configuration 6) The electronic conference system according to configuration 3, wherein, by the adjustment processing, the state of communication in a direction of transmitting data from the terminal device to the server is determined as the state of the communication between the server and the terminal device, and it is determined to analyze the state of the user using the data of the voice by the object change processing when executing the server mode and when it is determined that the state of the communication between the server and the terminal device is not good.

According to the electronic conference system of configuration 6, when the state of the communication in the direction of transmitting the data from the terminal device to the server is not good, it is possible to prevent the disturbance or the like of the display due to the communication delay and enable the user riding in the moving object to comfortably utilize the electronic conference.

(Configuration 7) The electronic conference system according to configuration 3, wherein, by the adjustment processing, the state of communication in a direction of transmitting data from the terminal device to the server is determined as the state of the communication between the server and the terminal device, and it is determined not to execute the object change processing when executing the terminal mode and when it is determined that the state of the communication between the server and the terminal device is not good.

According to the electronic conference system of configuration 7, when the state of the communication in the direction of transmitting the data from the terminal device to the server is not good, by not letting the object change processing be executed, the display regarding the electronic conference is stabilized, the load of the processor of the terminal device is reduced further, and the resources of the processor can be efficiently utilized.

(Configuration 8) The electronic conference system according to configuration 3, wherein the state of communication in a first direction of transmitting data from the terminal device to the server and the state of communication in a second direction of transmitting data from the server to the terminal device are determined respectively as the state of the communication between the server and the terminal device by the adjustment processing, and the terminal device does not display the display object on the electronic conference screen when executing the server mode or the terminal mode and when it is determined that the state of the communication in the first direction is good and also it is determined that the state of the communication in the second direction is not good.

According to the electronic conference system of configuration 8, corresponding to the state of the communication in the first direction and the second direction, while maintaining the state where the server can utilize the data, it is possible to prevent the disturbance or the like of the display due to the communication delay and enable the user riding in the moving object to comfortably utilize the electronic conference.

(Configuration 9) The electronic conference system according to any one of configurations 1 to 8, wherein the object change processing is processing of estimating an emotion of the user by analyzing at least one of the data of the image photographed in the moving object and the data of the voice detected in the moving object, and changing the display object according to the estimated emotion of the user.

According to the electronic conference system of configuration 9, by reflecting the emotion of the user on the display object, the electronic conference full of presence can be realized.

(Configuration 10) A control method of an electronic conference system including, in the electronic conference system including a server and a terminal device configured to communicate with the server, making the terminal device display an electronic conference screen including a display object corresponding to each of a plurality of users who participate in an electronic conference by the server, executing a plurality of application programs including an electronic conference program that makes the user riding in a moving object participate in the electronic conference by a processor by the terminal device, and executing object change processing of analyzing a state of the user using at least one of data of an image photographed in the moving object and data of voice detected in the moving object and changing the display object based on an analysis result, and adjustment processing of executing determination of a load of the processor provided in the terminal device and determination of a state of communication between the server and the terminal device, and selecting data to be used in the object change processing or determining propriety of execution of the object change processing according to the determination results.

According to the control method of the electronic conference system of configuration 10, the processing of changing the display object can be adjusted corresponding to the load of the processor of the terminal device and the communication state. Thus, the display of the screen regarding the conference can be maintained in the appropriate state in the terminal device used by the user riding in the moving object.

(Configuration 11) A non-transitory computer-readable storage medium storing a program making, when configuring an electronic conference system including a server, and a terminal device configured to communicate with the server, wherein the server makes the terminal device display an electronic conference screen including a display object corresponding to each of a plurality of users who participate in an electronic conference, and the terminal device includes a processor which executes a plurality of application programs including an electronic conference program that makes the user riding in a moving object participate in the electronic conference, the processor execute object change processing of analyzing a state of the user using at least one of data of an image photographed in the moving object and data of voice detected in the moving object and changing the display object based on an analysis result, and adjustment processing of executing determination of a load of the processor provided in the terminal device and determination of a state of communication between the server and the terminal device, and selecting data to be used in the object change processing or determining propriety of execution of the object change processing according to the determination results.

By executing the program of configuration 11, the processing of changing the display object can be adjusted corresponding to the load of the processor of the terminal device and the communication state. Thus, the display of the screen regarding the conference can be maintained in the appropriate state in the terminal device used by the user riding in the moving object.

REFERENCE SIGNS LIST

1 . . . vehicle (moving object), 2 . . . conference server (server), 4, 5 . . . terminal device, 10 . . . terminal device, 13 . . . communication device, 14 . . . . GNSS, 15 . . . touch panel, 16 . . . speaker, 17 . . . microphone, 18 . . . camera, 51 . . . conference screen, 100 . . . processor, 101 . . . conference client, 102 . . . image processing unit, 103 . . . emotion estimation unit, 104 . . . adjustment processing unit, 105 . . . . AV processing unit, 120 . . . memory, 121 . . . control program, 122 . . . conference app, 123 . . . . AV processing app, 124 . . . setting information, 125 . . . conference information, 126 . . . processing condition data, 200 . . . processor, 201 . . . conference processing unit, 202 . . . image processing unit, 203 . . . emotion estimation unit, 220 . . . memory, 221 . . . control program, 511 . . . first user image (display object), 512 . . . second user image (display object), 513 . . . present device image (display object), 514 . . . participant display unit, 1000 . . . electronic conference system, NW . . . communication network, U, U1, U2, U3 . . . user.

What is claimed is:

1. An electronic conference system comprising
a server, and a terminal device configured to communicate with the server,
wherein the server makes the terminal device display an electronic conference screen including a display object corresponding to each of a plurality of users who participate in an electronic conference, and
the terminal device includes a processor which executes a plurality of application programs including an electronic conference program that makes the user riding in a moving object participate in the electronic conference, the electronic conference system executing object change processing of analyzing a state of the user using at least one of data of an image photographed in the moving object and data of voice detected in the moving object and changing the display object based on an analysis result, and
adjustment processing of executing determination of a load of the processor provided in the terminal device and determination of a state of communication between the server and the terminal device, and selecting data to be used in the object change processing or determining propriety of execution of the object change processing according to the determination results.

2. The electronic conference system according to claim 1, being capable of executing a terminal mode of executing the object change processing by the terminal device and a server mode of executing the object change processing by the server,
wherein, when executing the terminal mode,
the terminal device transmits the display object changed in the object change processing to the server and
the server makes the terminal device display the electronic conference screen including the display object transmitted from the terminal device, and
when executing the server mode,
the terminal device transmits detection data including at least one of the data of the image photographed in the moving object and the data of the voice detected in the moving body to the server and
the server executes the object change processing using the detection data transmitted from the terminal device and makes the terminal device display the electronic conference screen including the display object changed in the object change processing.

3. The electronic conference system according to claim 2, wherein the data to be used in the object change processing is selected or the propriety of the execution of the object change processing is determined depending on which of the terminal mode and the server mode is being executed, by the adjustment processing.

4. The electronic conference system according to claim 3, wherein it is determined to analyze the state of the user using the data of the image by the object change processing regardless of the determination result of the load of the processor, when executing the server mode and when it is determined that the state of the communication between the server and the terminal device is good, by the adjustment processing.

5. The electronic conference system according to claim 3, wherein it is determined to analyze the state of the user using the data of the voice by the object change processing even when the determination result of the state of the communication between the server and the terminal device is good, when executing the terminal mode and when it is determined that the load of the processor is a high load, by the adjustment processing.

6. The electronic conference system according to claim 3, wherein, by the adjustment processing,
the state of communication in a direction of transmitting data from the terminal device to the server is determined as the state of the communication between the server and the terminal device, and
it is determined to analyze the state of the user using the data of the voice by the object change processing when executing the server mode and when it is determined that the state of the communication between the server and the terminal device is not good.

7. The electronic conference system according to claim 3, wherein, by the adjustment processing, the state of communication in a direction of transmitting data from the terminal device to the server is determined as the state of the communication between the server and the terminal device, and it is determined not to execute the object change processing when executing the terminal mode and when it is determined that the state of the communication between the server and the terminal device is not good.

8. The electronic conference system according to claim 3, wherein the state of communication in a first direction of transmitting data from the terminal device to the server and the state of communication in a second direction of transmitting data from the server to the terminal device are determined respectively as the state of the communication between the server and the terminal device by the adjustment processing, and the terminal device does not display the display object on the electronic conference screen when executing the server mode or the terminal mode and when it is determined that the state of the communication in the first direction is good and also it is determined that the state of the communication in the second direction is not good.

9. The electronic conference system according to claim 1, wherein the object change processing is processing of estimating an emotion of the user by analyzing at least one of the data of the image photographed in the moving object and the data of the voice detected in the moving object, and changing the display object according to the estimated emotion of the user.

10. A control method of an electronic conference system comprising, in the electronic conference system including a server and a terminal device configured to communicate with the server, making the terminal device display an electronic conference screen including a display object corresponding to each of a plurality of users who participate in an electronic conference by the server, executing a plurality of application programs including an electronic conference program that makes the user riding in a moving object participate in the electronic conference by a processor by the terminal device, and executing object change processing of analyzing a state of the user using at least one of data of an image photographed in the moving object and data of voice detected in the moving object and changing the display object based on an analysis result, and adjustment processing of executing determination of a load of the processor provided in the terminal device and determination of a state of communication between the server and the terminal device, and selecting data to be used in the object change processing or determining propriety of execution of the object change processing according to the determination results.

11. A non-transitory computer-readable storage medium storing a program making, when configuring an electronic conference system comprising a server, and a terminal device configured to communicate with the server, wherein the server makes the terminal device display an electronic conference screen including a display object corresponding to each of a plurality of users who participate in an electronic conference, and the terminal device includes a processor which executes a plurality of application programs including an electronic conference program that makes the user riding in a moving object participate in the electronic conference, the processor execute object change processing of analyzing a state of the user using at least one of data of an image photographed in the moving object and data of voice detected in the moving object and changing the display object based on an analysis result, and adjustment processing of executing determination of a load of the processor provided in the terminal device and determination of a state of communication between the server and the terminal device, and selecting data to be used in the object change processing or determining propriety of execution of the object change processing according to the determination results.

* * * * *